May 11, 1954     C. H. WIEGMAN ET AL     2,678,037
TRANSVERSE ACCESSORY DRIVE FOR ENGINES
Filed June 7, 1952     5 Sheets-Sheet 2

INVENTORS.
CLARENCE H. WIEGMAN
DUDLEY S. KING
JOHN H. CARPENTER
LEO S. ALDRICH
BY Alden D. Redfield
ATTY
Warren King
AGENT

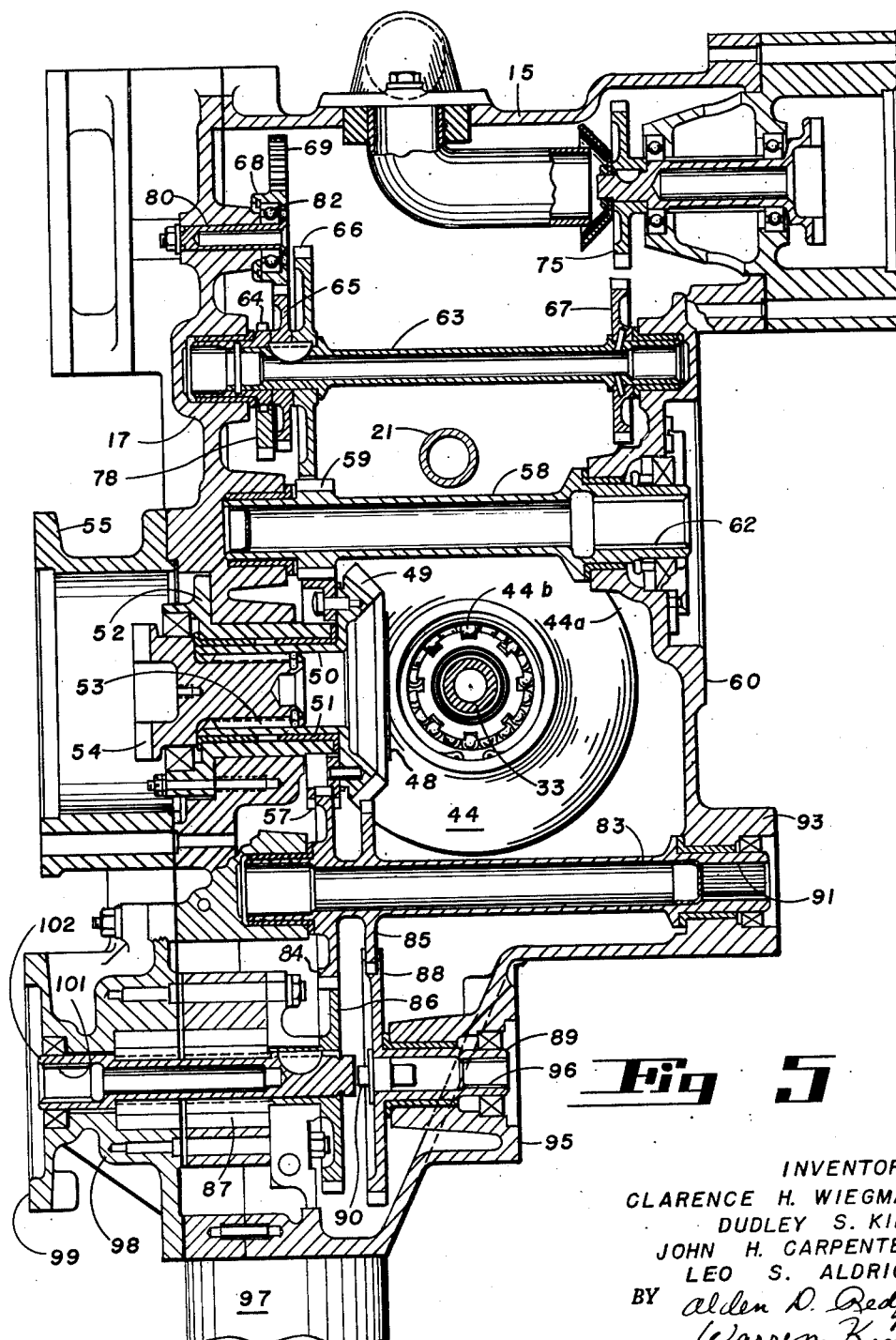

Patented May 11, 1954

2,678,037

UNITED STATES PATENT OFFICE 2,678,037

TRANSVERSE ACCESSORY DRIVE FOR ENGINES

Clarence H. Wiegman, Dudley S. King, John H. Carpenter, and Leo S. Aldrich, Williamsport, Pa., assignors to Avco Manufacturing Corporation, Cincinnati, Ohio, a corporation of Delaware Application June 7, 1952, Serial No. 292,374

9 Claims. (Cl. 123—195)

This invention relates to an accessory drive for an engine, more particularly an accessory drive for an internal combustion engine in which the various accessories driven by the engine are positioned with their axes of rotation transverse of the axis of rotation of the main drive shaft of the engine.

The present invention finds particular utility when used in conjunction with an aircraft engine in which space and weight limitations are critical. During recent years there has been a trend towards incorporating more and more accessories on such engines with the result that the rear section of the engine, which normally carries these accessories, has come to present a major design problem. In many conventional engines today, the multiplicity of accessories extending longitudinally from the rear of the engine has created serious service and installation problems, in addition to over-all engine proportionalities which are highly undesirable. It is the general purpose of the present invention to eliminate these difficulties and to provide a better proportioned aircraft engine with accessories which are more favorably located for aircraft use.

For purposes of illustration, the present invention has been shown with reference to an air cooled opposed cylinder engine, although it will be appreciated by those skilled in the art that the principles of the present invention can be applied with equal facility and advantage to other types of engines. It should further be noted that the invention is not limited to use on aircraft engines but finds utility on other types of engines where space and weight considerations and accessibility are important.

In accordance with the present invention, an accessory installation is provided in which all of the principal accessories of the engine are disposed with their axes of rotation perpendicular to the main driving shaft of the engine, which is usually a crankshaft. Not only are the accessories normal to the crankshaft, but they are mutually parallel and extend horizontally away from the center line of the engine.

The preferred embodiment of the present invention comprehends the provision of a plurality of accessory drive shafts for delivering power to the different accessories attached to the lateral faces of an accessory drive housing. Another characteristic of the installation is the provision of a geared supercharger impeller which is located directly at the rear of the engine in such a way that a carburetor, or other charge forming device, can be secured to the engine in a number of different positions, as may be desired.

An important object of the present invention is the provision of a transverse accessory installation in which a plurality of mutually parallel accessories extend laterally from the rear portion of the engine so that installation and servicing of the accessories are facilitated.

Another object of the present invention is the provision of an engine accessory installation which reduces the over-all length of the assembled engine so that space at the rear of the engine in an aircraft installation is conserved and effectively used. This reduction in over-all engine length also makes it possible to keep the center of gravity of the engine close to the center of lift of the aircraft.

A still further object of the present invention is to provide an aircraft engine which can be easily installed in an airplane.

Another object of the present invention is to provide an accessory drive arrangement in which a large number of accessories can be provided on an engine without encountering complicated design problems.

Another advantage of the present invention is that a plurality of accessories can be driven principally through simple spur gears rather than through bevel gears.

A specific object of the present invention is to provide an impeller installation with a minimum number of oil seals and one which can be supplied with a combustible mixture through a charge forming device located in any one of a plurality of positions as required by the dimensions of the aircraft in which the engine is installed.

Another specific object of the present invention is to provide an accessory installation which is readily adaptable to different engines so that a single accessory drive unit can be readily installed on a number of engines, thereby minimizing cost and service problems.

The novel features that are considered characteristic of this invention are set forth in the appended claims; the invention itself, however, both as to its organization and method of operation, together with additional objects and advantages thereof, will best be understood from the following description of a specific embodiment when read in conjunction with the accompanying drawings, in which:

Figure 5 is a cross sectional view of the accessory drive installation taken on plane 5—5 of Figure 4, the accessories being omitted for simplicity.

*Over-all assembly*

Figure 1:
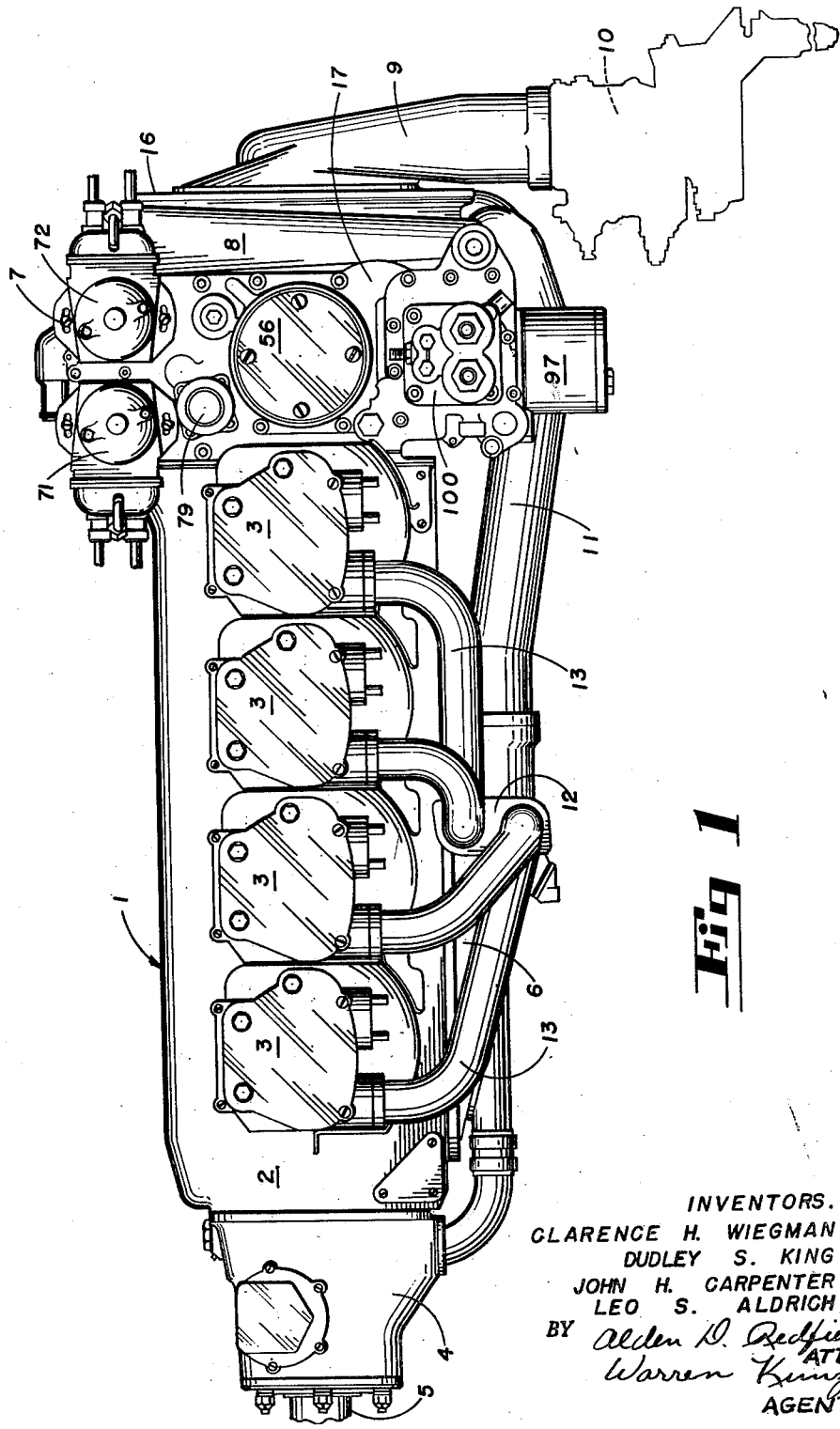
Figure 1 is an elevational view of the left side of the assembled engine including the accessory drive installation.
Figure 2:
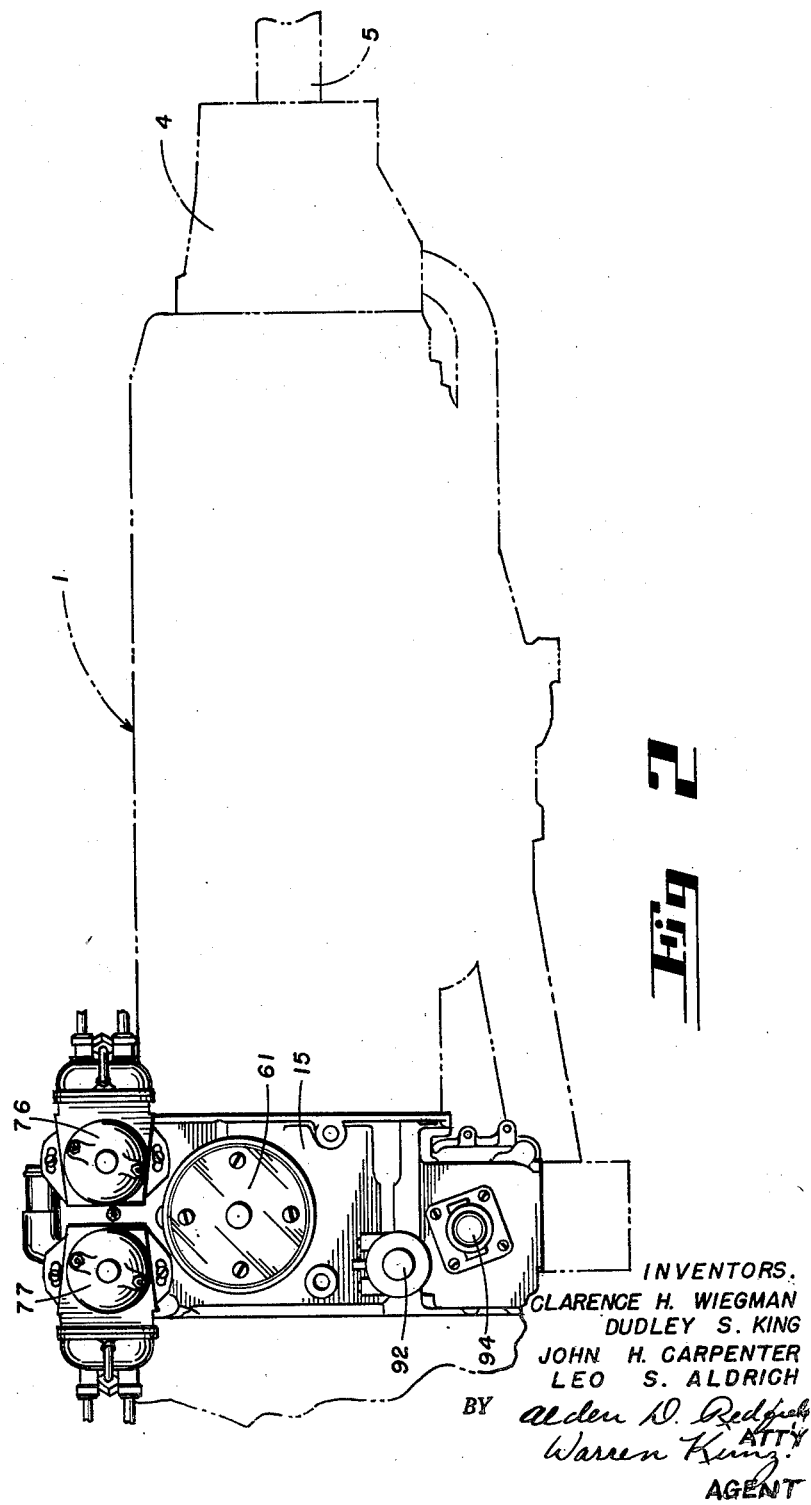
Figure 2 is a view similar to Figure 1 but showing the right side view of the engine, the engine being shown schematically while the accessory installation is shown in detail.
Figure 3:
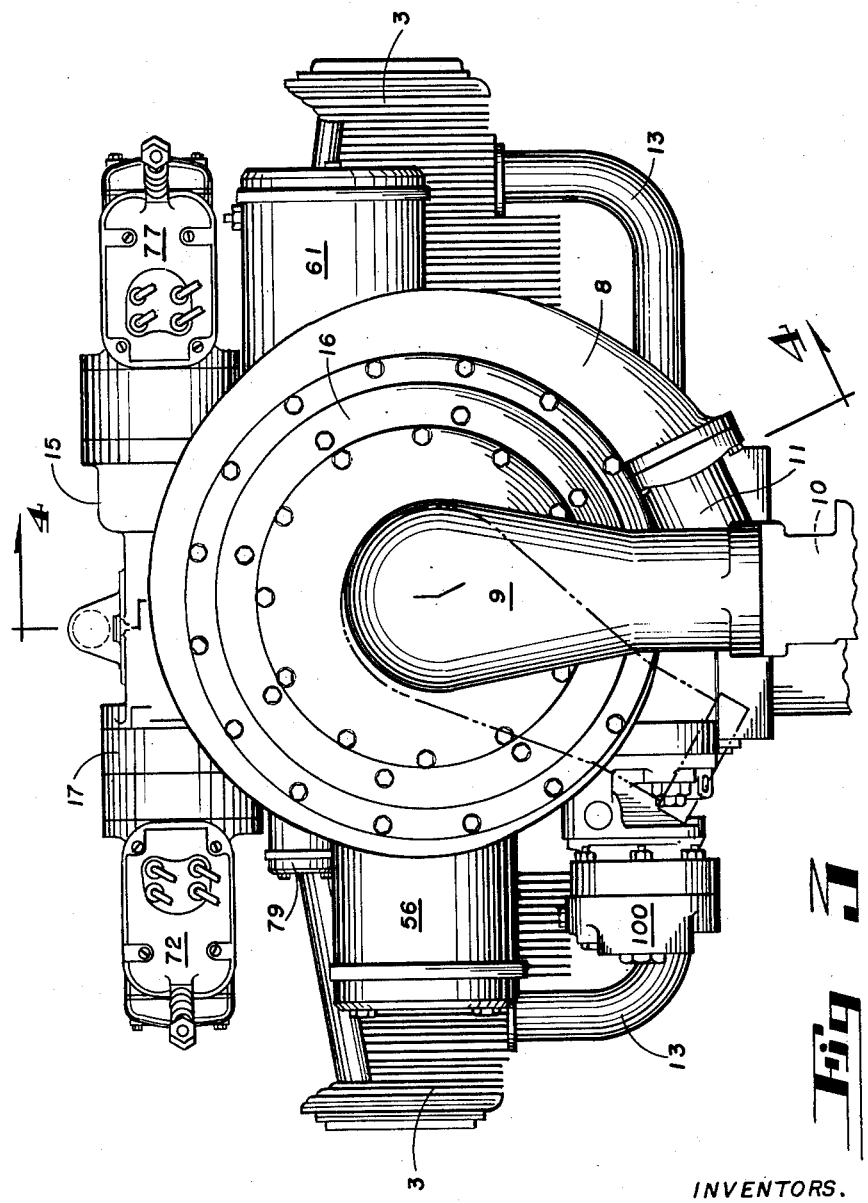
Figure 3 is an elevational view showing the rear of the engine and accessory drive installation.

As illustrated particularly well in Figures 1, 2, and 3, the preferred embodiment of the present invention has been shown in association with an air cooled opposed cylinder aircraft engine, generally designated 1. For the purposes of the present invention, most of this engine can be considered to be conventional, the engine comprising a crankcase 2, eight opposed cylinders 3, and a nose housing 4 from which projects propeller shaft 5. A sump 6 is secured beneath crankcase 2.

At the rear of the engine there is provided the novel accessory installation 7 of the present invention, the accessory section also including a blower casing 8 behind which is located an inlet casing 9.

Although the present invention may be used to advantage with engines which are not supercharged, it finds particular utility in such an engine, as shown in the accompanying figures. In an engine of this type, air is aspirated through carburetor 10, the combustible mixture formed in the carburetor passing through inlet casing 9 to a centrifugal supercharger, as yet not described. The supercharger compresses the mixture and supplies it to the blower casing 8 from which it flows by means of pipe 11 to a central distribution point 12. A plurality of inlet pipes 13 extend from distribution point 12 to the cylinders of the engine.

The power section of the engine is conventional. The power developed by the combustion of the combustible mixture in cylinders 3 is delivered to a crankshaft 14 (see Figure 4), the forward end of which has been indicated at 5. A propeller, or other power consuming means, may be secured to forward end 5 of the shaft to enable the engine to drive an aircraft or other device.

Although the present invention is not limited to an internal combustion engine of the Otto cycle type, the invention has been illustrated with reference to such an engine so that a full disclosure can be made of the accessory installation for this type of engine.

*Housing structure*

For convenience in assembly, the accessory installation is made in a number of housing sections, the principal one of which is housing 15 which is secured directly to the rear face of crankcase 2. Secured to the rear of housing 15 is blower housing 8 which in turn supports a cover section 16. Air inlet 9 is secured directly to the rear of cover section 16 (see Figure 4).

As illustrated in Figure 5, the left side face of housing 15 is open. A cover plate 17 is secured in covering relationship to the left side of housing 15, thereby completely enclosing the various elements of the accessory installation.

An annular diffuser 18 is mounted between blower housing 8 and cover section 16. The diffuser acts in a conventional manner to convert the velocity head of the high velocity gas stream, delivered by impeller 19, into a useful pressure head. The compressed combustible mixture passes from diffuser 18 through blower housing 8 and pipe 11 to the cylinders of the engine, as has been explained.

*Impeller drive*

Figure 4:
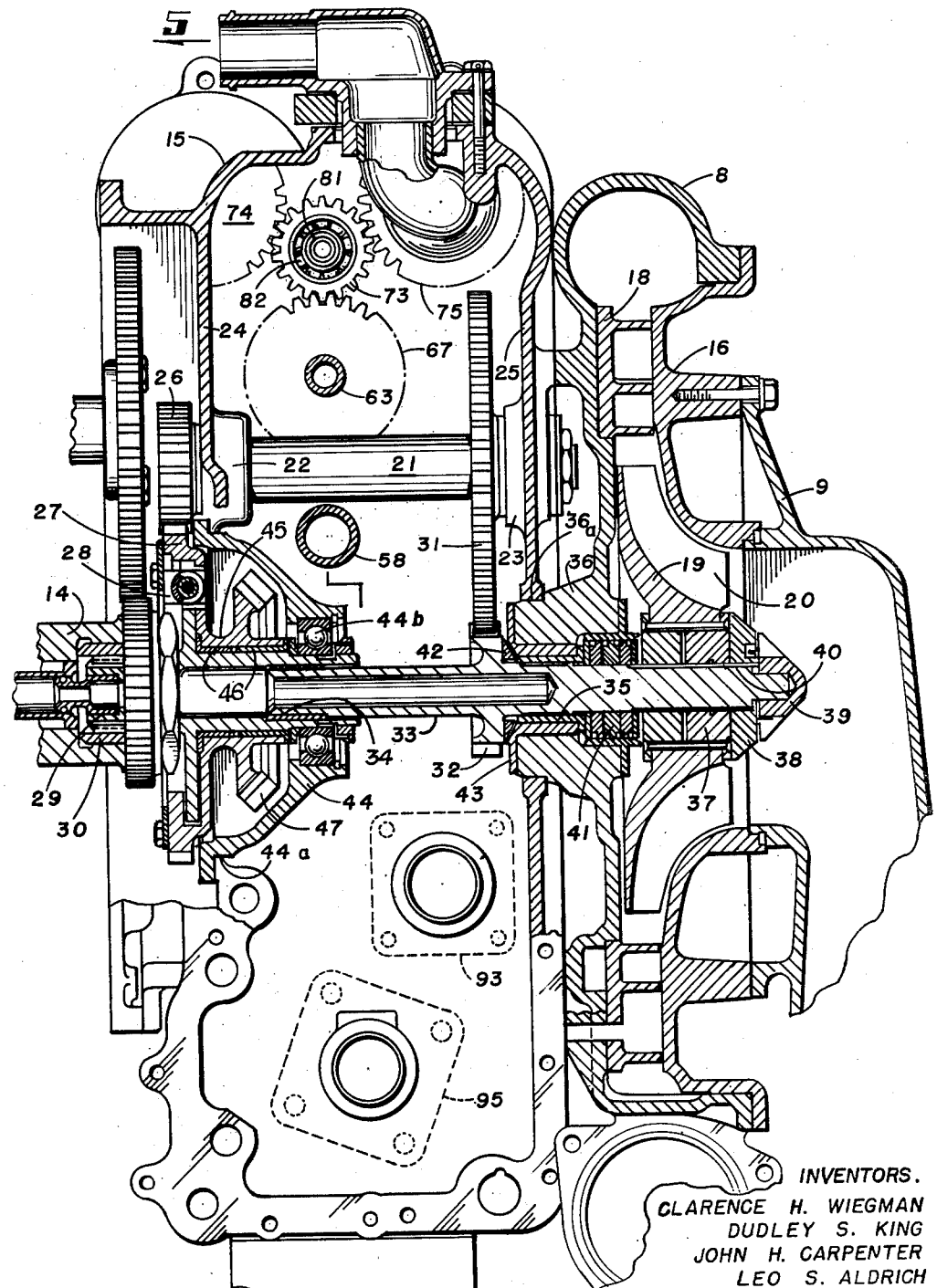
Figure 4 is a vertical longitudinal sectional view taken through the accessory drive installation on plane 4—4, as indicated in Figure 3.

As illustrated in Figure 4, the axis of rotation of impeller 19 is coaxial with crankshaft 14, the inlet of the impeller, 20, facing the rear of the engine in position to receive the combustible mixture supplied to the impeller through inlet casing 9.

The impeller is driven through a lay shaft 21 which is supported for rotation in bearings 22 and 23 in the front and rear walls 24 and 25, respectively, of accessory housing 15 (see Figure 4). Lay shaft 21 carries a spur gear 26 at its forward end. This spur gear is in mesh with spur gear 27 which comprises the outer annular element of a spring drive 28. The internal member 29 of the spring drive is internally splined within the rear end of crankshaft 14. To avoid replacement of the crankshaft, a replaceable hardened insert 30 may be force-fitted within the crankshaft to receive the splines of member 29.

The specific details of the spring drive have not been illustrated fully since this unit per se constitutes no part of the present invention. It will be sufficient to understand that the spring drive minimizes the transmission of torsional vibrations from the crankshaft to the impeller, and, in effect, constitutes a resilient member interposed in the impeller gear train.

A second spur gear 31 is secured to the rear end of lay shaft 21 and meshes with a smaller spur gear 32 formed integrally on impeller shaft 33. The forward end of shaft 33 is rotatably supported in a bushing 34 secured within the rear end of member 29. Shaft 33 extends rearwardly through another bushing 35 mounted in a forwardly extending boss 36 formed integrally with blower casing 8. Shaft 33 is splined at 40 to hub 37 of impeller 19 and a spacer and lock nut 38 and 39, respectively, are secured to the rear end of the impeller shaft for holding impeller 19.

Since spur gears 27 and 31 are considerably larger in diameter than spur gears 26 and 32, respectively, it will be appreciated that the rotational speed of the impeller is significantly greater than that of the crankshaft. In the engine illustrated, the crankshaft rotates at 3300 R. P. M. when the engine is developing take-off horsepower. Since the over-all gear ratio between the impeller shaft and the crankshaft is 7.91 to 1.0, it will be understood that the impeller rotates at 26,103 R. P. M. during the time the engine is developing take-off power.

In view of the fact that gearing within accessory housing 15 must be well lubricated, it will be apparent that provision must be made for excluding oil from the blower casing. In the preferred embodiment, a seal ring installation is provided, as at 41, to prevent passage of oil along the surface of shaft 33 to the blower casing. The importance of this seal will be appreciated when it is realized that any oil passing to the blower casing passes directly to the engine cylinders where it forms carbon deposits and smoke in the exhaust of the engine.

Operation of a centrifugal impeller normally produces a thrust towards the impeller inlet. In the preferred embodiment, this thrust is transferred through a spherical thrust washer 42 to a hardened steel sleeve 43 which is pressed within the boss 36. Sleeve 43 also directly supports bushing 35.

Considering the over-all aspects of the impeller installation, it will be noted that the impeller shaft is well supported by two spaced bearing members 34 and 35 of ample bearing capacity to adequately support the overhung impeller 19. In an installation of the preferred type, only a single oil seal is necessary, as at 41, and the alignment of shaft 33 is simplified, since boss 36 may be piloted in an opening 36a provided in rear wall 25 of housing 15.

To insure adequate bearing support for bushing 34 and internal member 29, an adapter 44 is piloted within opening 44a formed in forward wall 24 of housing 15. As illustrated in Figure 4, adapter 43 extends into the accessory housing and supports the rear end of internal member 29 by ball bearing 44b, the forward end of this member being supported by the internal splines within insert 30.

It will be noted that spur gear 27 has a rearwardly extending cylindrical projection 45 which is supported by bushings 46 for rotation on the exterior of internal member 29. By virtue of this support, relative motion between members 27 and 29 can be accommodated.

Accessory drives

All of the accessories, except the supercharger, are driven through bevel gear 47 which is formed integrally on extension 45 of spur gear 27. As illustrated in Figure 5, an opening 48 is formed in adapter 44 in position to expose a portion of bevel gear 47. A second bevel gear 49 engages the exposed teeth of gear 47, gear 49 being formed integrally with a laterally extending sleeve 50. Sleeve 50 is supported for rotation by bushings 51 which are force-fitted within an adapter 52 carried by cover plate 17. Sleeve 50 is internally splined at 53 to receive the internal end of a starter dog 54 which is located at the left side of the accessory installation. Another adapter 55 is secured to cover plate 17 for supporting a starter 56 (see Figures 1 and 3) which is attached to the adapter so that the starter may engage dog 54 to supply energy for turning over the engine through meshed bevel gears 47 and 49.

The structural details of the starter and other accessories will not be described since per se they constitute no part of the present invention. It will be sufficient to understand that this starter is of a conventional aircraft type, either electrical or pneumatic, and is adapted to supply energy for starting the engine under the control of the pilot.

All of the accessories of the engine receive their driving energy through a spur gear 57 secured to the rear of bevel gear 49 (Figure 5). A transverse lay shaft 58, bearing a spur gear 59 in mesh with gear 57, is supported by the right sidewall 60 of the accessory housing 15 and cover plate 17. Lay shaft 58 extends through wall 60 to which is secured an electrical generator 61 (Figures 2 and 3). This generator is a conventional unit and is provided with a projecting splined shaft which is engaged with internal splines 62 formed in the right-hand end of lay shaft 58.

Another laterally extending lay shaft 63 is provided above shaft 58. Four spur gears 64, 65, 66, and 67 are secured for conjoint rotation to lay shaft 63. Spur gear 66 is in mesh with spur gear 59, thereby imparting rotation to lay shaft 63.

Lay shaft 63 is merely an intermediate driving member and does not have any accessories directly associated with it. It is to be noted, however, that spur gear 65 is in mesh with an idler gear 68 (Figure 5) which, in turn, meshes with a pair of magneto drive gears, one of which is shown at 69, associated in driving relationship with the left-hand magnetos 71 and 72 (see Figure 1). Spur gear 67 is also in mesh with an idler gear 73 (Figure 4) which, in turn, is in mesh with magneto drive gears 74 and 75 which transfer power to and drive the right-hand magnetos 76 and 77, respectively (Figure 2).

The small spur gear 64 on lay shaft 63 engages a tachometer drive gear 78 which is directly connected to a tachometer 79 (Figure 1).

It will be noted that idler gears 68 and 73 are secured to cover plate 17 and wall 60 of housing 15 by through-bolts 80 and 81, respectively. Nuts are provided on the outer ends of these bolts for securing them to their associated housing members. The inner ends of the through-bolts support ball bearings 82 by which idler gears 68 and 73 are rotatably supported on the through-bolts.

The engine illustrated is provided with dual ignition, as required in all aircraft engines. Since, at this time, there are no acceptable 8-cylinder aircraft engine magnetos available, four 4-cylinder magnetos have been provided for the engine arranged for 8-cylinder engine operation. Since 6-cylinder engine magnetos are available, a 6-cylinder engine, similar to the engine illustrated, need only be provided with two magnetos for satisfactory dual ignition operation.

In the lower part of the accessory housing, there is provided another transverse lay shaft 83 carrying a pair of spur gears 84 and 85. Spur gear 84 is in mesh with spur gear 57 through which it receives its driving energy. Gear 84 is also in mesh with gear 86 of oil pump assembly 87 for driving the oil pump.

Gear 85 is in mesh with spur gear 88 which is provided on the inner end of fuel pump drive 89. As illustrated in Figure 5, oil pump 87 and fuel pump drive 89 are coaxially disposed, a thrust bearing member 90 being provided between the inner ends of these units.

The right-hand end of lay shaft 83 is internally splined, as at 91, to receive the projecting end (not shown) of a vacuum pump 92 (Figure 2) which is secured to projecting boss 93 on the right-hand side of the accessory housing.

Fuel pump 94 (Figure 2) is secured to a projecting boss 95 (Figure 5), also located on the right-hand side of the accessory housing, the fuel pump being engaged with the fuel pump drive 89 through internal splines 96.

Oil pump 87 contains two sections (not illustrated) one section for scavenging the oil from inside the engine while the second section pumps oil and provides oil under pressure for use throughout the engine. Strainers 97 are provided beneath the accessory housing for straining the oil before it is supplied to the pressure section of the oil pump.

Inasmuch as the lubrication system of this engine is of no direct importance in the description of this invention, the specific details of this system have not been illustrated and described. It will be sufficient to understand that oil is constantly circulated through the engine under pressure, the oil draining to the interior of the engine, being scavenged by the oil pump and put back into circulation by the pressure pump. The oil pump carries an outer cover member 98 having a projecting flange 99 to which a hydraulic pump 100 (Figures 1 and 3) is secured. The hydraulic pump is a conventional unit having a splined projecting shaft (not shown) which is engaged with internal splines 101 formed on transverse pump shaft 102 to which spur gear 86 is secured. The energy, delivered through gears 57, 84, and 86, drives shaft 102, the associated scavenge and oil pressure pumps, as well as the hydraulic pump 100.

Summary

In view of the foregoing description of the specific details of the accessory installation, it will be appreciated that provision is made in the rear section for the following accessories.

On the left-hand side of the engine: Two magnetos, a tachometer, a starter, oil pressure and scavenge pumps, and a hydraulic pump.

On the right-hand side of the engine: Two magnetos, an electrical generator, a vacuum pump, and a fuel pump.

The gear ratio of these various accessories relative to crank-shaft speed, in addition to their directions of rotation when viewed from their respective sides of the engine, are tabulated in the following list:

| Accessory | Gear Ratio Relative To Crankshaft Speed | Direction of Rotation |
| --- | --- | --- |
| Magnetos (left side) | 0.500:1 | Clockwise. |
| Magnetos (right side) | 0.500:1 | C'Clockwise. |
| Tachometer | 0.500:1 | Do. |
| Starter | 1:1 | Clockwise. |
| Generator | 2.6:1 | Do. |
| Vacuum pump | 1.219:1 | Do. |
| Hydraulic pump | 1.083:1 | Do. |
| Fuel pump | .803:1 | C'Clockwise. |

Considering the over-all aspects of the accessory installation set forth, it should be noted that all of the accessories project laterally from the sides of the engine, thus markedly reducing the over-all length of the engine and rendering every accessory readily accessible from the sides of the engine. Since engines of this type are usually installed in aircraft having cowls which open from the side, it will be appreciated that the lateral disposition of the accessories greatly facilitates service and installation. Furthermore, since a certain amount of space is normally necessary for the removal of the accessories, a significant amount of space at the rear of the engine is conserved by locating the accessories at the sides rather than at the rear of the engine.

It should be further noted that the accessory installation illustrated is remarkably compact for the large number of accessories involved. Despite this compactness, every accessory is accessible and adequately supported on its own mounting pad.

Another point of importance is that the impeller is located at the rear of the engine on an overhung bearing structure, thereby minimizing the number of oil seals that must be provided. In addition, this location of the impeller makes it possible to swing the inlet housing 9 to a plurality of positions to accommodate various types of aircraft installations. Inlet housing 9 is illustrated in two typical positions by full lines and phantom lines in Figure 3.

Those skilled in the art will also recognize that the accessory installation taught by the present invention may be readily adapted to engines of different displacements. For instance, the preferred embodiment illustrated could be readily adapted for use on a 6-cylinder engine, it merely being necessary to provide an impeller of smaller capacity and to rearrange slightly the magneto drive gears, as has been mentioned.

It should be clearly understood that the accessory installation shown is merely illustrative of a particular arrangement of accessories found convenient for the engine shown. Without departing from the underlying principles of this invention, it is possible to rearrange the accessory section to meet the requirements of any particular engine, the invention being characterized principally by an installation in which all of the accessories are disposed laterally of and perpendicular to the center line of the engine, all of the axes of rotation of the accessories being disposed horizontally and parallel to one another.

Having described a preferred embodiment of our invention, we claim:

1. In an engine having a main power shaft, an accessory drive installation comprising a pair of meshed bevel gears with their axes of rotation disposed at 90°, one of said gears being secured to the main power shaft of the engine, transverse laterally extending accessory drive means, said other bevel gear being secured to said drive means, a spur gear secured to said accessory drive means, a plurality of transverse lay shafts extending parallel to and in spaced relationship with said accessory drive means, spur gears secured to said lay shafts respectively, certain of said spur gears being in mesh with each other, at least one of said spur gears on said lay shafts being in mesh with said spur gear on said accessory drive means, and a plurality of laterally extending accessories in driven relationship with said lay shafts.

2. An accessory drive installation for an engine having a main power shaft, said installation comprising a plurality of housings secured to the rear of the engine for enclosing the installation, an accessory drive means rotatably supported by one of said housings and extending laterally in relation to the main power shaft, means for transferring power from the shaft to said accessory drive means, a plurality of laterally extending lay shafts rotatably supported by said housings in parallel spaced relationship with said accessory drive means, meshing gear means on said accessory drive means and said lay shafts, and a plurality of laterally extending accessories secured to the exterior of said housings in driven engagement with certain of said lay shafts.

3. In an aircraft engine having a main power shaft and a crankcase surrounding the shaft, an improved accessory installation comprising a housing secured to the rear of the crankcase; accessory driving means rotatably supported by said housing transversely of the crankshaft, the axis of said driving means being coplanar with the axis of the crankshaft; meshed bevel gears secured to the crankshaft and said accessory driving means for transferring power to said accessory driving means; a plurality of transverse lay shafts rotatably supported by said housing in mutually parallel spaced relationship with said accessory driving means, certain of said lay shafts being above, and others below, the level of the crankshaft; meshed gears on said accessory drive means and said lay shafts whereby power from said accessory drive means is transferred to said lay shafts, certain of said lay shafts projecting through the side walls of said housing; and a plurality of parallel laterally extending accessories secured to the exterior of said housing in position to engage the extending ends of said lay shafts.

4. In a supercharged aircraft engine having a crankcase surrounding a crankshaft, an improved accessory drive installation comprising a housing secured to the rear of the crankcase, a transverse shaft member rotatably supported by said housing in laterally extending relationship adjacent the crankshaft, meshed gears associated with said shaft member and crankshaft for transferring power from the crankshaft to said shaft member, a plurality of transverse lay shafts rotatably supported by said housing in parallel spaced relationship with said shaft member, meshed gear means on said shaft member and said lay shafts, certain of said lay shafts extending through the side walls of said housing for accessory drive purposes, a blower housing secured to the rear of said housing, an impeller within said blower housing, a rearwardly extending impeller drive shaft coaxially disposed with relation to the crankshaft, a rearwardly extending lay shaft parallel to said impeller shaft, and meshed gear means associated with said impeller, rearwardly extending lay shaft and crankshaft, whereby power from the crankshaft is transferred to said impeller shaft, and means for securing said impeller to said impeller shaft.

5. An accessory drive installation for an engine having a power shaft, said installation comprising a housing secured to the engine adjacent one end of the shaft, an auxiliary shaft having its axis of rotation coplanar with the axis of the engine shaft, said auxiliary shaft being transverse of the engine and extending laterally from the engine shaft, means for transferring power from the engine shaft to said accessory shaft, a plurality of laterally extending lay shafts rotatably supported by said housing in mutually parallel relationship with said auxiliary shaft, and meshing gear means on said auxiliary and lay shafts, certain of said lay shafts extending through the side walls of said housing for accessory drive purposes.

6. In an aircraft engine including a crankcase surrounding a crankshaft, one end of which is exposed at the rear of the crankcase, an accessory drive installation comprising a housing secured to the rear of the crankcase, an auxiliary drive member rotatably supported by said housing in transverse laterally extending disposition adjacent the end of the crankshaft, the axis of rotation of said auxiliary drive member being co-planar with the axis of rotation of the crankshaft, bevel gears associated with the crankshaft and said auxiliary drive member for transferring power from the crankshaft to said auxiliary drive member and vice versa, a spur gear secured to said auxiliary drive member for conjoint rotation therewith, a plurality of transverse lay shafts extending between the side walls of said housing, a plurality of meshed spur gears on said lay shafts, one spur gear on at least one lay shaft being in mesh with said spur gear on said auxiliary drive member, certain ends of said lay shafts extending through the side walls of said housing to provide power drives for engine accessories.

7. Apparatus as described in claim 6 and, in addition, idler gears in meshed engagement with certain of the spur gears on said lay shafts, and magneto drive gears in meshed engagement with said idler gears.

8. An aircraft engine including a power section having a crankcase surrounding a crankshaft, one end of which is exposed at the rear of the crankcase, and having an accessory housing secured to the rear of the crankcase, an accessory drive installation including a plurality of parallel transverse accessories laterally extending from the accessory housing of the engine, the accessory drive installation comprising a transverse laterally extending shaft member rotatably supported by the accessory housing, a plurality of transverse lay shafts parallel to said shaft member, and gear means on the crankshaft, said shaft member and said lay shafts for transferring power from the crankshaft to said lay shafts, certain of said lay shafts projecting from the accessory housing in driving engagement with said accessories.

9. An accessory drive installation for an engine or the like having a main shaft, said installation comprising a housing secured to the engine adjacent one end of the shaft, a laterally extending auxiliary shaft adjacent the end of the main shaft, means for transferring power from the main shaft to said accessory shaft, a plurality of laterally extending lay shafts rotatably supported by said housing in mutually parallel relationship with said auxiliary shaft, and meshing gear means on said auxiliary and lay shafts, certain of said lay shafts extending through the side walls of said housing for accessory drive purposes.

References Cited in the file of this patent

UNITED STATES PATENTS

| Number | Name | Date |
| --- | --- | --- |
| 1,104,423 | Huff | July 21, 1914 |
| 1,377,378 | White | May 10, 1921 |
| 2,001,866 | Caminez | May 21, 1935 |
| 2,172,100 | Hoffman et al. | Sept. 5, 1939 |
| 2,426,878 | Willgoos | Sept. 2, 1947 |
| 2,653,591 | Cole et al. | Sept. 29, 1953 |

FOREIGN PATENTS

| Number | Country | Date |
| --- | --- | --- |
| 294,357 | Great Britain | July 26, 1928 |
| 320,878 | Great Britain | Oct. 23, 1929 |